Oct. 9, 1956  D. H. MONTGOMERY ET AL  2,765,916
WASTE-PROCESSING MEANS FOR A MACHINE TOOL
Filed Aug. 12, 1952
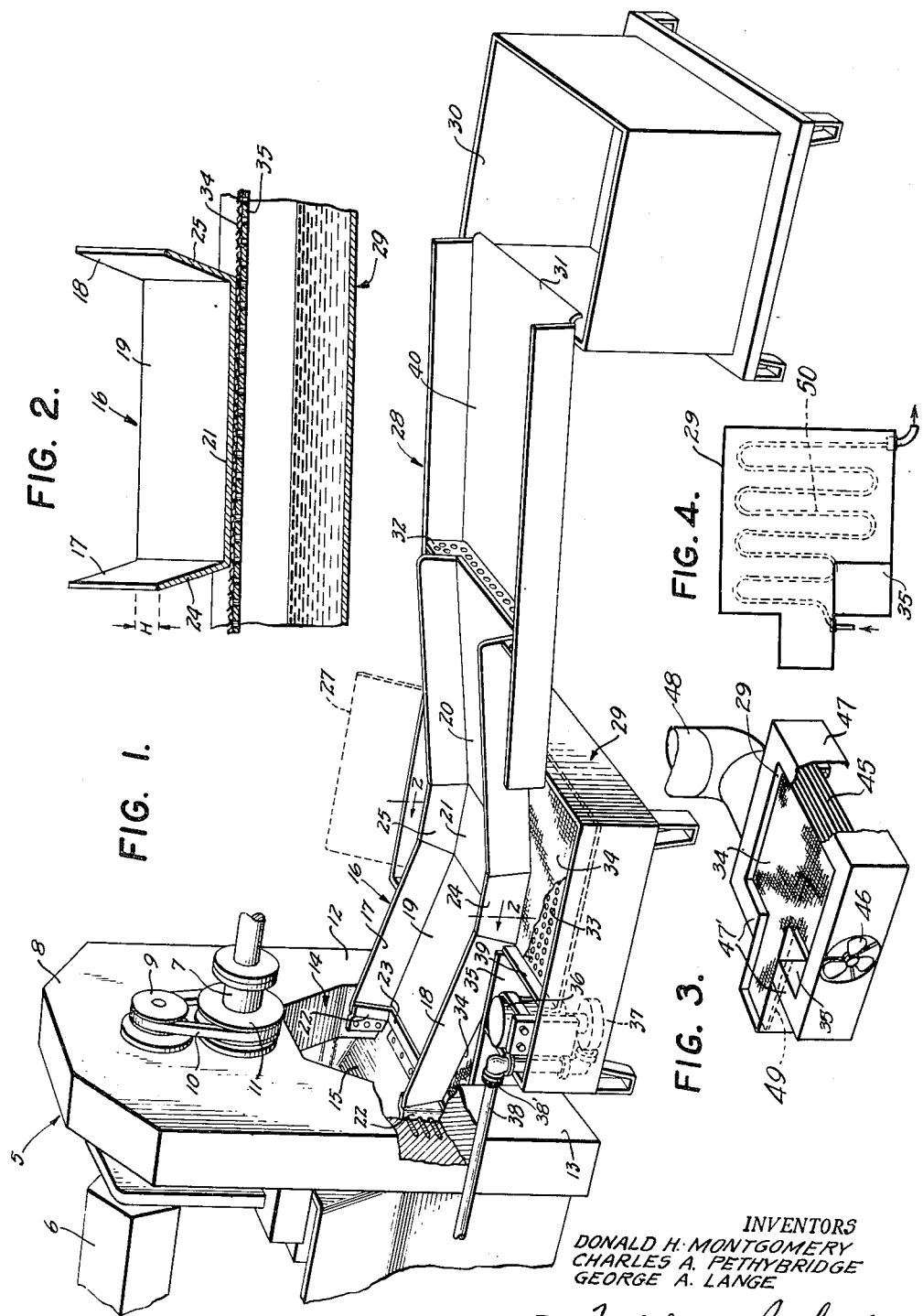
INVENTORS
DONALD H. MONTGOMERY
CHARLES A. PETHYBRIDGE
GEORGE A. LANGE
BY Mitchell & Bechert
ATTORNEYS

United States Patent Office

2,765,916
Patented Oct. 9, 1956

2,765,916

WASTE-PROCESSING MEANS FOR A MACHINE TOOL

Donald H. Montgomery, Farmington, Charles A. Pethybridge, New Britain, and George H. Lange, West Hartford, Conn., assignors to The New Britain Machine Company, New Britain, Conn., a corporation of Connecticut Application August 12, 1952, Serial No. 303,984

5 Claims. (Cl. 210—44)

Our invention relates to improved filtering means, as for removing scrap and suspended solids from a fluid such as cutting oil or coolant used in a machine tool.

It is an object of the invention to provide an improved means of the character indicated.

It is another object to provide relatively high-capacity filtering means for handling a large flow of cutting oil or the like fluid, and continuously recycling the use of such fluid in an automatic machine tool.

It is another object to provide improved filtering mechanism as an integral part of the means for removing scrap from an automatic machine tool.

It is also an object to provide an improved means for transferring externally of a machine tool the heat generated in the working area; more specifically, it is an object to provide means whereby direct convection from hot chips or coolant will not substantially heat the machine tool.

Another object is to provide an improved means for removing scrap from an automatic machine tool.

Still another object is to provide a multiple-stage filtering action in a device of the character indicated.

A further object is to meet the above objects substantially only by the employment of gravity action and without the requirement for special pressure differentials.

It is a general object to meet the above objects with a mechanism which is simple, which may be readily adapted to a continuous-flow process, and in which maintenance problems are reduced to a minimum.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a view in perspective, with certain parts broken away, and showing a filtering mechanism of the invention as applied to an automatic machine tool;

Fig. 2 is an enlarged, fragmentary, sectional view taken in the plane 2—2 of Fig. 1;

Fig. 3 is a simplified perspective view, partly broken away and illustrating a modification of part of the mechanism of Fig. 1; and Fig. 4 is a simplified plan view of an alternative for the device of Fig. 3.

Briefly stated, our invention contemplates the substantial avoidance of heat accumulation in the cutting area of an automatic machine tool, so that tools, slides, and spindles may be operated a maximum capacity without overheating. To this end, we provide means such as at wide, downwardly inclined ramp to pass both the coolant or cutting oil and the hot chips or scrap out of the machine as rapidly as possible. Externally of the machine, we provide quickly detachable means for reprocessing the cutter oil or coolant and for disposing of the scrap. In a first stage of filtering or oil separation, scrap and other solids suspended in the coolant or cutting oil are allowed to precipitate in a first reservoir while the relatively cleansed fluid passes over a spillway in such first reservoir. Fluids thus partially cleansed are then spread over a relatively large-area filtering shelf or tray for screening, before dropping into a large-capacity second reservoir beneath the tray. Substantial quantities of heat may be extracted from the fluid in the second reservoir, and pumping means having an inlet at the bottom of the second reservoir may pass the cleansed coolant or cutting oil back to the machine for recycled use.

Referring to the drawings, our invention is shown in application to the removal of scrap from and the cleansing of coolant or cutting oils used by a machine tool 5, which may be a single-spindle automatic, as disclosed in our copending patent application, Serial No. 196,108, filed November 17, 1950, now Patent No. 2,680,281, dated June 8, 1954. In such machine, tools are carried by a multiple-station turret 6 for operation on work supported (behind frame member 8 and, therefore, not visible in Fig 1) in a spindle 7, revolving in an upstanding end-frame member 8. Spindle drive is obtained from the works of the machine (not shown) and is delivered by a shaft passing through the arbor for the turret 6 and available at a pulley 9, for drive through a belt 10 to a spindle pulley 11. The end-frame member 8 may include spaced legs 12—13 straddling an enlarged opening 14, through which an internal ramp 15 may pass chips, coolant, cutting oil, and other products of the machining process. The ramp 15 is shown sloping downwardly toward the front end of the machine.

In accordance with the invention, we provide external filtering means directly applicable to an automatic machine such as the machine 5 for receiving the products of the machining operations, as, for example, such products as may tumble or flow down the ramp 15. For this purpose, we show a first or coarse filtering means, which may be an elongated trough 16 with upstanding side walls 17—18. The trough 16 may include a depressed central section 21, as defined by ramps 19—20, inclined inwardly from the central section 21; we prefer that the fluid-retaining volume of trough 16, including the central section 21, shall be substantial, with an extensive top-surface area. To assure that the trough 16 may cleanly receive products from ramp 15, we apply adapter members 22 to the sides of legs 12—13 and a similar adapter member 23 to the ramp 15, so as to define insertion slots capable of receiving both the ramp 19 and the side walls 17—18, as will be understood.

In order that the trough 16 may perform a coarse-filtering function, we provide one of the walls 24—25, at the central section 21, with a maximum elevation (above the bottom 21) exceeding the minimum elevation of the longitudinal ends of ramps 19—20. In Fig. 2, this relationship of elevations is demonstrated by the dimension H, so that spillover may occur over both central walls 24—25. Thus, when cutting oil, coolant, and scrap, chips, and the like flow down the ramp 15—19 into the central section 21, the fluids may accumulate until the fluid level reaches a spillover point, at walls 24—25.

The trough 16 will thus be seen to be a reservoir with spillway means at 24—25. Fluids entering this reservoir will be laden with suspended solids and will therefore be more dense than those at the top level of accumulated fluid in the reservoir 16. The fluid which is spilled over the reservoir 16 will thus have had a chance to precipitate relatively dense solid matter, so that it may be said to have been processed in a first decanting stage. Also, scrap quickly passed out of machine 5 will settle in the fluid in reservoir 16 to give up substantial quantities of heat to the fluid; some of this heat will radiate from the large exposed surface area of reservoir 16 and of the fluid contained therein.

In accordance with a feature of the invention, we provide means for further separating cleansed coolant or cutting oil from the scrap, while at the same time facilitating the removal of the scrap. For this purpose, we provide further trough means 28, having an end which may be overlapped by the ramp 20 of trough 16. One end of the trough 28 may rest upon an outer wall of a second reservoir 29, and the other end of trough 28 may be supported by the wall of a truck or scrap-disposal box 30. We prefer that the support for trough 28 be such as to incline trough 28 in the same sloping direction as ramp 20, so that any fluids released on trough 28 may drain into reservoir 29. To retain trough 28 while thus inclined, the outer end 31 of trough 28 may be bent over, as shown, to define a retaining lip.

In order that fluids released on ramp 28 and draining into reservoir 29 may be relatively free of solid matter, we prefer that the space between ramp 20 and trough 28, at the overlapping portion, shall include strainer means. We have shown the strainer means as a rigid barrier 32, which may be brazed or otherwise fixed to the trough 28, so as to cover substantially the included cross-sectional area of trough 28, except preferably for a cut-out portion contoured in accordance with the profile of the projecting end of ramp 20. The barrier 32 may be of screening or of perforated sheet metal, as shown, and may provide support for the forward end 20 of trough 16.

In accordance with another feature of the invention, we provide a further stage of filtering and cooling at reservoir 29. Reservoir 29 may be a large tank including a tray or shelf 33 supported above the bottom of reservoir 29 and having a plurality of interstices for the through passage of filtered fluids. The tray 33 is shown to be of perforated metal, and adequate filtering action may be obtained by merely laying a sheet 34 of disposable filtering cloth or the like over the entire area of the tray 33. We have found starched cheesecloth (crinoline) or buckram to be very adequate for this purpose, and, since these materials are inexpensive, they may be expended each time the filter is serviced.

The tray 33 is preferably set below the top of the reservoir walls, and in the form shown is of an area slightly less than that of the reservoir 29, so as to define at one corner an open area 35 for direct access to fluids that have filtered to the bottom of reservoir 29. This open area may removably accommodate pumping means 36, including an inlet 37 near the bottom of the reservoir 29 and an outlet 38 for passing cleansed fluids back to the machine 5 for recycled use. Outlet 38 may include quick-disconnect means at 38' for facilitating replacement of reservoir 29, as will be understood.

At the opening 35, the tray 33 may be limited by an upstanding wall 39 of lesser elevation than that of the reservoir 29. This feature enables wall 39 to serve as a spillway into the lower regions of the reservoir 29, should the filter screen 34 be unable to handle an excessive accumulation of fluid, as when screen 34 becomes unduly clogged.

In certain operations, it may develop that the described filtering stages provide an insufficient cooling of the fluids being recycled to the machine. In such cases, the described apparatus lends itself to the employment of auxiliary cooling methods. Thus, in Fig. 3, we show provision of cooling fins on the outer walls of reservoir 29, as at 45. Fan means 46 may direct cooling air past the radiating fins and to direct the draft we show an external duct enclosure 47, with exhaust means 48. At the side nearest the machine 5, the duct 47' will be understood to pass under a shallow ramp 49 for conducting filtered fluid into the main volume of reservoir 29. In Fig. 4, we illustrate a system of pipes 50 in the lower part of reservoir 29 to pass a steady flow of water or other coolant through the hot filtered fluids, so that the processed fluids recycled at 38 to the machine may be cool as well as clean.

In operation, the machine 5 may continuously operate and therefore continuously deliver scrap, chips, cutting oil, or coolant down ramps 15—19 to the central section 21 of trough 16. This process will take place rapidly so that the hot products of cutting operations will not be permitted to accumulate within the machine. At this external location, substantially all the heat may be removed by radiation or by other means. Coarsely cleansed fluids will spill over walls 24—25 after a first decanting process, so as to spread over the relatively large area of screen 34 for a filtering process. The accumulated cleansed and cooled fluid may then be returned to the machine by means of pump 36. When scrap accumulations develop to a sufficient extent, the machine operator need only use an ordinary garden rake to drag the scrap over the ramp 20 and into the forward area 40 of ramp 28, thus freeing the central section 21 for reception of further scrap accumulations. The scrap which has been left at the portion 40 of trough 28 may be allowed to drain through straining means 32 until the next scrap is to be raked out of the central section 21. At this time, the drained scrap at 40 may be pulled into the hopper 30, and the undrained scrap at 21 may be pulled to the draining area 40.

For protection against splashing, as when there is a heavy flow of chips and coolant, splash guards as suggested at 27, may be removably attached to opposite sides of reservoir 29, as will be understood.

It will be appreciated that we have described a relatively simple means for extracting substantial quantities of heat externally of a machine tool, for reprocessing coolant or cutting oil for recycled use thereof, and for facilitating the removal of scrap. The heat exchange outside the machine allows higher-speed cutting operations than would ordinarily not be tolerable if chips were permitted to remain in the machine, even for a short time. The manual operations required are extremely simple, and no harm is done if the operator should carelessly allow over-accumulations. We have found that the solid separation in the first stage of decanting is so effective that a cheesecloth screen 34 may last a matter of weeks before it becomes clogged to such an extent as to become an ineffective filter. The only servicing ordinarily necessary is the disposal and replacement of screen 34, but if greater servicing is necessary the entire device may be quickly disconnected and replaced.

While we have described our invention in detail for the preferred forms shown, it will be understood that modifications may be made within the scope of the invention as defined in the claims which follow.

We claim:

1. In a device for separating suspended solids from a liquid, a reservoir including upstanding retaining walls, outlet means for said reservoir filtering means including a horizontal perforated shelf rigidly supported by said walls at an elevation intermediate the upper and lower limits of said walls, and a trough having a flat central section resting on said filtering means and of substantially less horizontal extent than said filtering means, said trough including two upwardly inclined ramps at opposite longitudinal ends thereof, and upstanding walls defining lateral limits of said trough and extending continuously along both sides of the ramp and central sections of said trough, the upper elevation of one of said last-mentioned walls at said central section being less than the elevation of the two outer ends of said ramps, whereby when one of said ramps is placed beneath the cutting region of a machine tool, chips and other solids mixed with cutting oil or the like may be conveyed down the one ramp to said central section where the cutting oil may be preliminarily separated from the solids by spilling over said one last-mentioned wall and onto said filtering means.

2. A device according to claim 1 in which said reservoir includes cooling means comprising a coolant-circulating pipe, supported in the reservoir space beneath said shelf.

3. A device according to claim 1, in which said filtering means includes a disposable filter element.

4. In a device for separating suspended solids from a liquid, means comprising elongated settling-trough means supported with upwardly inclined ramp ends rising from a depressed central section, the maximum elevation of a wall of said trough means at said central section being less than the minimum elevation of the bottom of said trough means at the longitudinal ends thereof, whereby a spillway is defined at said central section, a further trough overlapped by one of the inclined ramp ends of said first-mentioned trough, and sloping in the same general direction as the overlapping end of said first-mentioned trough, separating means including strainer means between said troughs at the overlapped portions thereof, and liquid-collecting means beneath the spillway and beneath the lower end of said further trough.

5. A device according to claim 4, in which said strainer means comprises a rigid barrier having a plurality of interstices therein and rigidly carried by said second-mentioned trough, said barrier being cut away substantially to the contour of the overlapping end of said first trough, so that, when said troughs overlap at said barrier, said barrier may strain any liquid passing through the space between overlapping poritons of said troughs.

References Cited in the file of this patent

UNITED STATES PATENTS

| | | |
|---|---|---|
| 942,428 | Williams | Dec. 7, 1909 |
| 1,044,074 | Nugent | Nov. 12, 1912 |
| 1,175,640 | Kiefer | Mar. 14, 1916 |
| 1,362,522 | Biette | Dec. 14, 1920 |
| 1,579,638 | Brooke | Apr. 8, 1926 |
| 1,706,228 | Harden et al. | Mar. 19, 1929 |
| 1,872,892 | Clanton | Aug. 23, 1932 |
| 1,963,945 | Lyman et al. | June 19, 1934 |
| 2,070,202 | Gordon | Feb. 9, 1937 |
| 2,071,998 | Buse | Feb. 23, 1937 |
| 2,099,061 | Gordon | Nov. 16, 1937 |
| 2,281,590 | Newton | May 5, 1942 |
| 2,295,982 | Widman | Sept. 15, 1942 |
| 2,400,879 | Hilliker | May 28, 1946 |
| 2,434,679 | Wagner et al. | Jan. 20, 1948 |

FOREIGN PATENTS

| | | |
|---|---|---|
| 103,670 | Great Britain | Jan. 24, 1918 |